United States Patent
Yamato et al.

[11] 3,818,015
[45] June 18, 1974

[54] 1(POLYMETHOXYBENZYL) 6 HYDROXYL 1,2,3,4 TETRAHYDRO ISOQUINOLINES

[75] Inventors: Eisaku Yamato, Yono; Masao Wada, Warabi; Toshio Sekiguchi, Omiya; Masanori Sato, Toda; Taku Nagao, Ageo; Hiromichi Nakajima, Yono; Akio Kiyomoto, Musashino; Masazumi Kawanishi, Tokyo, all of Japan

[73] Assignee: Tanabe Seiyaku Co., Ltd., Osaka, Japan

[22] Filed: Dec. 7, 1971

[21] Appl. No.: 205,704

[30] Foreign Application Priority Data
Dec. 17, 1970 Japan............................ 45-113378

[52] U.S. Cl.... 260/289 R, 260/283 SY, 260/286 R, 260/348, 260/340.9, 424/258
[51] Int. Cl............................................. C07d 35/00
[58] Field of Search..................... 260/289 R, 286 R

[56] References Cited
UNITED STATES PATENTS

| | | | |
|---|---|---|---|
| 2,663,709 | 12/1953 | Craig.............................. | 260/286 R |
| 2,683,146 | 7/1954 | Robinson....................... | 260/286 R |
| 3,497,516 | 2/1970 | Mashimo........................ | 260/286 R |
| 3,557,122 | 1/1971 | Shaver et al. .................. | 260/289 R |
| 3,647,799 | 3/1972 | Watanabe...................... | 260/286 R |

FOREIGN PATENTS OR APPLICATIONS

| | | | |
|---|---|---|---|
| 113,277 | 6/1941 | Australia........................ | 260/289 R |

OTHER PUBLICATIONS
I. Wasawa et al., Jap. Jour., Pharmacology, Vol. 17, P-H3–52 (1967).
Kametani et al., Chem. Abstr., Vol. 71, CoL61172V, (1969).

Primary Examiner—Donald G. Daus
Attorney, Agent, or Firm—Bierman & Bierman

[57] ABSTRACT

A tetrahydroisoquinoline compound of the formula:

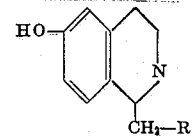

(I)

wherein R is a trimethoxyphenyl, dimethoxyphenyl or methylene-dioxyphenyl radical, and pharmaceutically acceptable acid addition salts thereof. These compounds are peripheral vasodilators and are particularly effective in increasing the cerebral blood flow.

The compound (I) is prepared by condensing three-hydroxyphenethylamine with a phenylglycidic acid compound of the formula;

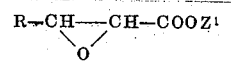

wherein $Z^1$ is an alkyl radical or an alkali metal, and R has the same meaning as defined above. Alternatively, the compound (I) may be prepared by dehydrating the compound of the formula;

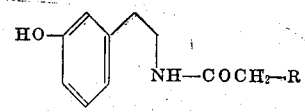

wherein R has the same meaning as defined above, followed by hydrogenation of the resultant dihydroisoquinoline compound.

7 Claims, No Drawings

1-(POLYMETHOXYBENZYL) 6 HYDROXYL 1,2,3,4 TETRAHYDRO ISOQUINOLINES

This invention relates to novel derivatives of 1,2,3,4-tetrahydroisoquinoline and a process for preparing same.

The tetrahydroisoquinoline derivatives of the present invention are represented by the following formula;

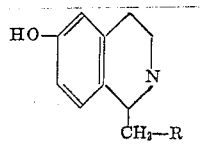

(I)

wherein R is a trimethoxyphenyl, dimethoxyphenyl or methylene-dioxyphenyl radical. Pharmaceutically acceptable acid addition salts of the foregoing derivatives are also included within the scope of the present invention.

It has been found that the above-mentioned novel tetrahydroisoquinoline compounds (I) and their acid addition salts are useful as peripheral vasodilators. The activity of the tetrahydroisoquinoline compounds (I) is particularly characterized by their remarkable effect in increasing the cerebral blood flow. For instance, 1-(3,4,5-trimethoxybenzyl)-6-hydroxy-1,2,3,4-tetrahydroisoquinoline (hydrochloride) enables to increase the blood flow in the vertebral artery of dog about 70 percent when the compound is administered intravenously at a dose of 30 μg/kg. Moreover, the tetrahydroisoquinoline compounds (I) can be readily absorbed from digestive tracts and at the same time maintain their vasodilating activity for a long period of time. For instance, when 1-(3,4,5-trimethoxybenzyl)-6-hydroxy-1,2,3,4-tetrahydroisoquinoline (hydrochloride) is administered duodenally to dogs at a dose of 300 μg/kg, the increasing effect of the compound in the blood flow in the vertebral artery reaches to about 120 percent after 10 minutes of the administration, and said activity maintains for more than 1 hour.

The tetrahydroisoquinoline compounds (I) also show a potent vasodilating activity on the common carotid artery. For instance, 1-(3,4,5-trimethoxybenzyl)-6-hydroxy-1,2,3,4-tetrahydroisoquinoline (hydrochloride) enables to increase the blood flow in the common carotid artery of dog about 40 percent when the compound is administered intravenously at a dose of 30 μg/kg.

The toxicity of the tetrahydroisoquinoline compounds (I) is relatively low. For instance, the acute toxicity ($LD_{50}$) of 1-(3,4,5-trimethoxybenzyl)-6-hydroxy-1,2,3,4-tetrahydroisoquinoline hydrochloride, when administered to mice intravenously, is about 105 mg/kg.

According to one embodiment of the present invention, a tetrahydroisoquinoline compound of the formula (I) can be prepared by condensing 3-hydroxy-phenethylamine with a phenylglycidic acid compound of the formula;

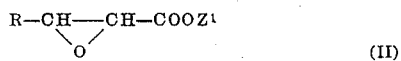

(II)

wherein $Z^1$ is an alkyl radical or an alkali metal, and R has the same meaning as defined above.

The condensation reaction may be accomplished by admixing 3-hydroxy-phenethylamine or its acid addition salt with the phenylglycidic acid compound (II) under an acidic condition. The reaction pH may be adjusted with a conventional acid such as hydrochloric acid, acetic acid, etc. Water, a water miscible organic solvent such as methanol, ethanol, propanol or a mixture thereof are suitable as the reaction solvent. It is preferred to carry out the reaction at 15° to 80°C, especially at 20° to 30°C.

According to another embodiment of the present invention, the tetrahydroisoquinoline compound (I) can be prepared by condensing 3-hydroxy-phenethylamine with a phenylacetic acid compound of the formula;

$$R - CH_2COZ^2$$

(III)

wherein $Z^2$ is a hydroxy or alkoxy radical or a halogen atom and R has the same meaning as defined above, subjecting the resultant N-(3-hydroxyphenethyl)-2-phenylacetamide compound (IV) to intramolecular cyclization, and hydrogenating the resultant dihydroisoquinoline compound (V).

The above-mentioned reactions may be represented by the following scheme;

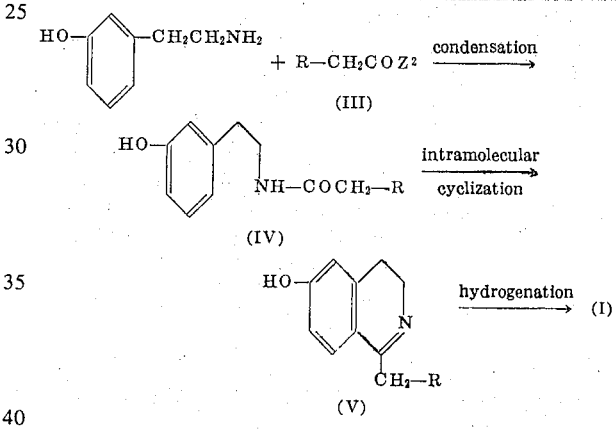

wherein the symbols have the same meaning as defined above.

The condensation reaction of the first step can be accomplished in conventional manner. For instance, when the phenylacetic acid compound (III) is employed in the form of free acid or alkyl ester, said reaction may be carried out by heating the mixture of the starting compounds at 150° to 200°C, especially at 170° to 180°C. On the other hand, when the phenylacetic acid compound (III) is employed in the form of acid halide (e.g., acid chloride, acid bromide), the condensation reaction of the starting compounds may be carried out in the presence of an alkali agent in an aqueous solvent. In the latter case, it is preferred to carry out the reaction at 5° to 10°C. Preferred examples of said alkali agent are sodium hydroxide, sodium carbonate, sodium bicarbonate, pyridine, triethylamine etc. Water, a mixture of water and benzene or chloroform are suitable as the aqueous solvent.

The intramolecular cyclization of the acetamide compound (IV) may be carried out in the presence of a dehydrating agent in a suitable solvent. Phosphorous oxychloride, phosphorus pentachloride, polyphosphoric acid or polyphosphoric esters may be preferably employed as the dehydrating agent. Benzene and toluene are suitable as the reaction solvent. It is preferred to carry out the reaction under refluxing.

The subsequent hydrogenation reaction of the dihydroisoquinoline compound (V) can be accomplished in an appropriate procedure. For instance, the tetrahydroisoquinoline compound (I) may be readily obtained by hydrogenating the compound (V) with sodium borohydride or in the presence of a catalyst such as platinum, palladium or palladium-carbon. The hydrogenation of the compound (V) with sodium borohydride may be carried out in a solvent such as methanol, ethanol, aqueous methanol or aqueous ethanol. Alternatively, the catalytic hydrogenation of the compound (V) may be carried out under one to three atmospheric pressure in a solvent (e.g., Methanol, ethanol, water and a mixture thereof.)

The tetrahydroisoquinoline compounds (I) thus obtained can be employed for the pharmaceutical purpose in both forms of bases and of their salts, which are readily convertible from one to the other by a conventional manner. Preferred examples of the pharmaceutically acceptable acid addition salts of the compounds (I) include inorganic acid addition salts such as hydrochloride, hydrobromide, perchloride, nitrate, sulfate, phosphate, and organic acid addition salts such as formate, acetate, propionate, glycollate, lactate, pyruvate, oxalate, malonate, succinate, maleate, fumarate, malate, citrate, tartrate, ascorbate, hydroxymaleate, benzoate, phenylacetate, aminobenzoate, methanesulfonate, ethanesulfonate, benzene-sulfonate, p-toluenesulfonate, sulfanilate, aspartate and glutamate. Furthermore, the tetrahydroisoquinoline compounds (I) may be used in the form of pharmaceutical preparations containing them in conjunction or admixture with a pharmaceutical excipient suitable for enteral or parenteral administration.

Suitable excipients are substances that do not react with said tetrahydroisoquinoline compounds (I). Among these are included gelatin, lactose, glucose, sodium chloride, starch, magnesium stearate, talcum, vegetable oil, benzyl alcohol, gums or other known medicinal excipients.

The pharmaceutical preparations may be in solid form such as tablets, coated tablets, pills or cupsules; or in liquid form such as solutions, suspensions or emulsions. They may be sterilized and/or may contain auxiliaries, such as preserving, stabilizing, wetting or emulsifying agents. They may further contain other therapeutically valuable substances.

Practical and presently-preferred embodiments of the present invention are illustratively shown in the following examples.

EXAMPLE 1

4 g of 3-hydroxy-phenethylamine hydrochloride are dissolved in 250 ml of water. A solution of 7 g of sodium 3-(3,4,5-trimethoxyphenyl)-glycidate in 50 ml of water is added to the solution. Then, 9.3 ml of 10 percent hydrochloric acid and 9.3 ml of acetic acid are added to the mixture. The mixture is stirred for 140 hours at room temperature. After the reaction is completed, insoluble materials are removed by filtration. The aqueous layer is concentrated to dryness. Acetone is added to the residue, and precipitated crystals are collected by filtration. The crystals are recrystallized from 1 percent hydrochloric acid. 2.54 g of 1-(3,4,5-trimethoxybenzyl)-6-hydroxy-1,2,3,4-tetrahydroisoquinoline hydrochloride are obtained as colorless needles. Yield: 38.1 percent M.p. 228° – 230°C (decomp.)

EXAMPLE 2

10 g of 3-hydroxyphenethylamine hydrochloride are dissolved in 520 ml of water. A solution of 13.75 g of sodium 3-(2,3,4-trimethoxyphenyl)-glycidate in 100 ml of water is added to the solution. Then, 20 ml of 10 percent hydrochloric acid and 20 ml of acetic acid are added to the mixture. The mixture is stirred for 112 hours at room temperature. After the reaction is completed, insoluble materials are removed by filtration. The aqueous layer is washed with benzene, and then concentrated to dryness. Acetone is added to the residue. Precipitated sodium chloride is removed by filtration. The filtrate is concentrated to dryness, and the residue thus obtained is recrystallized from a mixture of methanol and ether. 3.99 g of 1-(2,3,4-trimethoxybenzyl)-6-hydroxy-1,2,3,4-tetrahydroisoquinoline hydrochloride are obtained as colorless scaly crystals. Yield: 24 percent M.p. 224° – 226°C. (decomp.)

EXAMPLE 3

10 g of 3-hydroxy-phenethylamine hydrochloride are dissolved in 200 ml of water. A solution of 15.7 g of sodium 3-(3,4-methylenedioxyphenyl)-glycidate in 420 ml of water is added to the solution. Then, 24 ml of 10 percent hydrochloric acid and 20 ml of acetic acid are added to the mixture. The mixture is stirred for 144 hours at room temperature. After the reaction is completed, the mixture is concentrated to dryness. Acetone is added to the residue, and precipitated crystals are collected by filtration. After dryness, the crystals are recrystallized from water and then from a mixture of methanol and ether. 4.74 g of 1-(3,4-methylenedioxybenzyl)-6-hydroxy-1,2,3,4-tetrahydroisoquinoline hydrochloride are obtained as colorless prisms. Yield: 32.6 percent M.p. 242° – 243-°C. (decomp.)

EXAMPLE 4

10 g of 3-hydroxy-phenethylamine hydrochloride are dissolved in 520 ml of water. A solution of 12.3 g of sodium 3-(3,4-dimethoxyphenyl)-glycidate in 100 ml of water is added to the solution. The mixture is stirred for 112 hours at room temperature. After the reaction is completed, insoluble materials are removed by filtration. The aqueous layer is concentrated to dryness. Acetone is added to the residue, and precipitated crystals are collected by filtration. After dryness, the crystals are recrystallized from 10 percent hydrochloric acid and then from a mixture of methanol and ether. 4.72 g of 1-(3,4-dimethoxybenzyl)-6-hydroxy-1,2,3,4-tetrahydroisoquinoline hydrochloride are obtained as colorless prisms. Yield: 30.9 percent M.p. 257° – 259°C. (decomp.)

EXAMPLE 5

To a solution of 12 g of sodium hydroxide in 90 ml of water are added 17.4 g of 3-hydroxy-phenethylamine hydrochloride. Then, 19.7 g of 3,4,5-trimethoxyphenylacetyl chloride are added dropwise to the solution for 25 minutes at 5° to 10°C under stirring. The mixture is stirred for 1.5 hours at the same temperature and for 3 hours at 10° to 20°C, respectively. After washing with benzene, the reaction mixture is acidified with 10 percent hydrochloric acid to liberate an oil. The oil becomes solid after a while. The solidified product is collected by filtration, dried and then recrystallized from a mixture of acetone and n-hexane. 20.7 g of N-(3-hydroxy-phenethyl)-2-(3,4,5-trimethoxyphenyl)-acetamide are obtained as colorless needles. Yield: 60 percent M.p. 135° – 136°C.

A mixture of 15 g of N-(3-hydroxy-phenethyl)-2-(3,4,5-trimethoxyphenyl)-acetamide and 50 ml of phosphorous oxychloride is refluxed for 6 hours. The reaction mixture is evaporated under reduced pressure to remove the excess amount of phosphorus oxychloride. The residue is poured into ice water, and the aqueous solution is concentrated under reduced pressure. The residue thus obtained is dissolved in chloroform. After drying, the chloroform solution is evaporated to remove chloroform. The residual oil thus obtained is dissolved in 100 ml of 10 percent sodium hydroxide. Then, the aqueous solution is refluxed for an hour. After cooling, the aqueous layer is removed by decantation, and 30 ml of 10 percent hydrochloric acid are added to the residue. The resultant precipitates are collected by filtration. The precipitates are washed with acetone and then recrystallized from 5 percent hydrochloric acid. 7.8 g of 1-(3,4,5-trimethoxybenzyl)-6-hydroxy-3,4-dihydroisoquinoline hydrochloride are obtained as pale yellow prisms. Yield: 48.4 percent M.p. 242° – 243°C. (decomp.)

2 g of 1-(3,4,5-trimethoxybenzyl)-6-hydroxy-3,4-dihydroisoquinoline hydrochloride is suspended into 10 ml of methanol. One g of sodium borohydride is added gradually to the suspension under ice-cooling and under stirring. The suspension is refluxed for 30 minutes. Then, the suspension is evaporated to remove solvent. The residue thus obtained is acidified with 10 percent hydrochloric acid, and then alkalified with sodium carbonate. The alkaline solution is extracted with chloroform. After drying, the solution is evaporated to remove chloroform. The residue thus obtained is recrystallized from methanol. 1.47 g of 1-(3,4,5-trimethoxybenzyl)-6-hydroxy-1,2,3,4-tetrahydroisoquinoline are obtained as colorless prisms. Yield: 81 percent M.p. 184° – 186°C.

What we claim is:

1. A tetrahydroisoquinoline compound of the formula

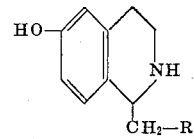

in which R is 2,3,4-trimethoxyphenyl or 3,4-dimethoxyphenyl, or a phramaceutically acceptable acid addition salt thereof.

2. The compound, as described in claim 1, wherein R is 2,3,4-trimethoxyphenyl.

3. The compound, as described in claim 1, wherein R is 3,4-dimethoxyphenyl.

4. The compound, as described in claim 2, wherein said pharmaceutically acceptable acid addition salt is a hydrohalide salt.

5. The compound, as described in claim 3, wherein said pharmaceutically acceptable acid addition salt is a hydrohalide salt.

6. 1-(3,4,5- trimethoxybenzyl)-6-hydroxy-1,2,3,4-tetrahydroisoquinoline or a pharmaceutically acceptable acid addition salt thereof.

7. The compound, as described in claim 6, wherein said pharmaceutically acceptable acid addition salt is a hydrohalide salt.

* * * * *